Oct. 25, 1932.  E. KINSELLA  1,884,737
PUMPING APPARATUS
Filed Dec. 12, 1927  3 Sheets-Sheet 3
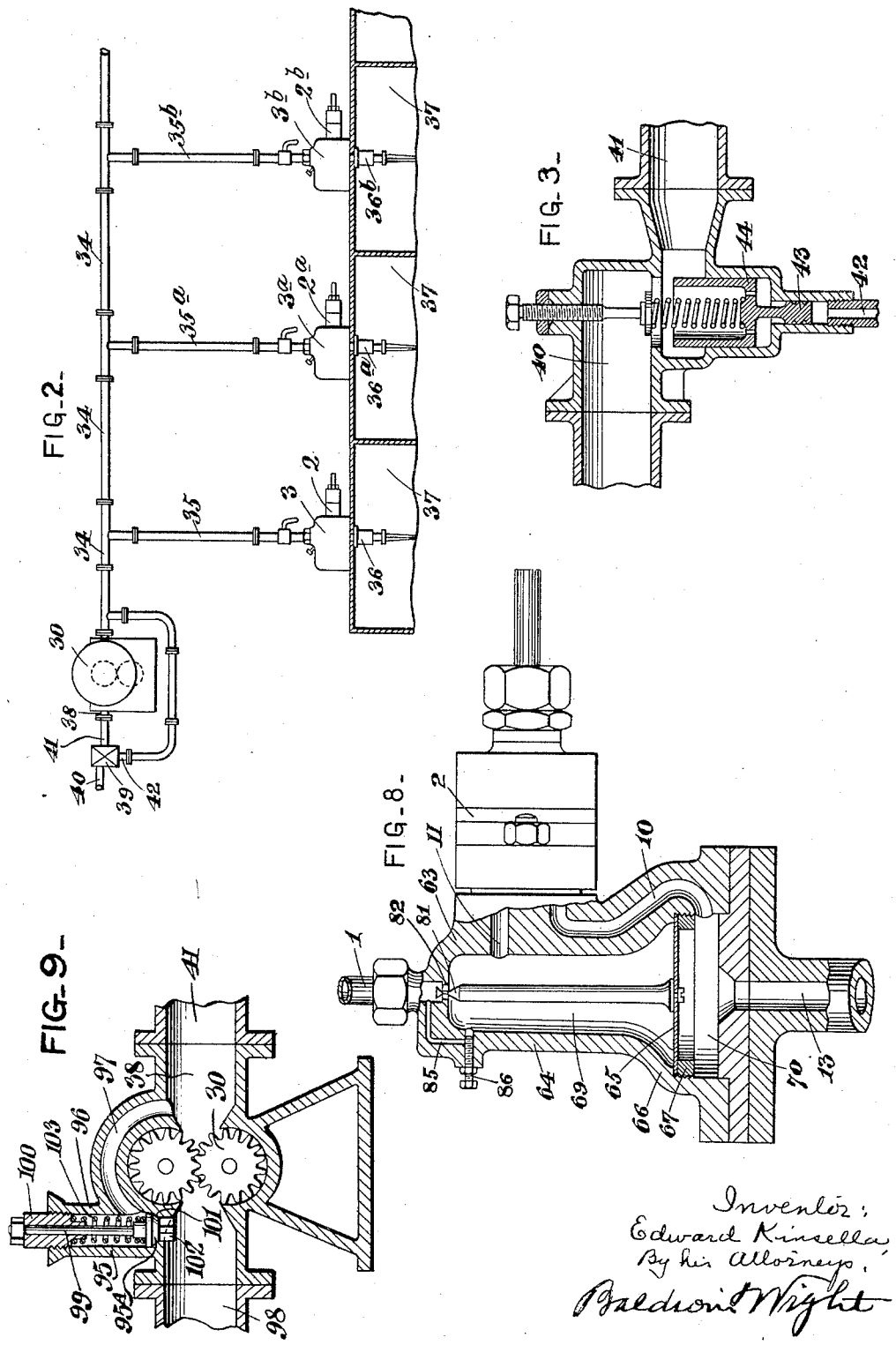
Inventor:
Edward Kinsella,
By his Attorneys,
Baldwin Wright Patented Oct. 25, 1932

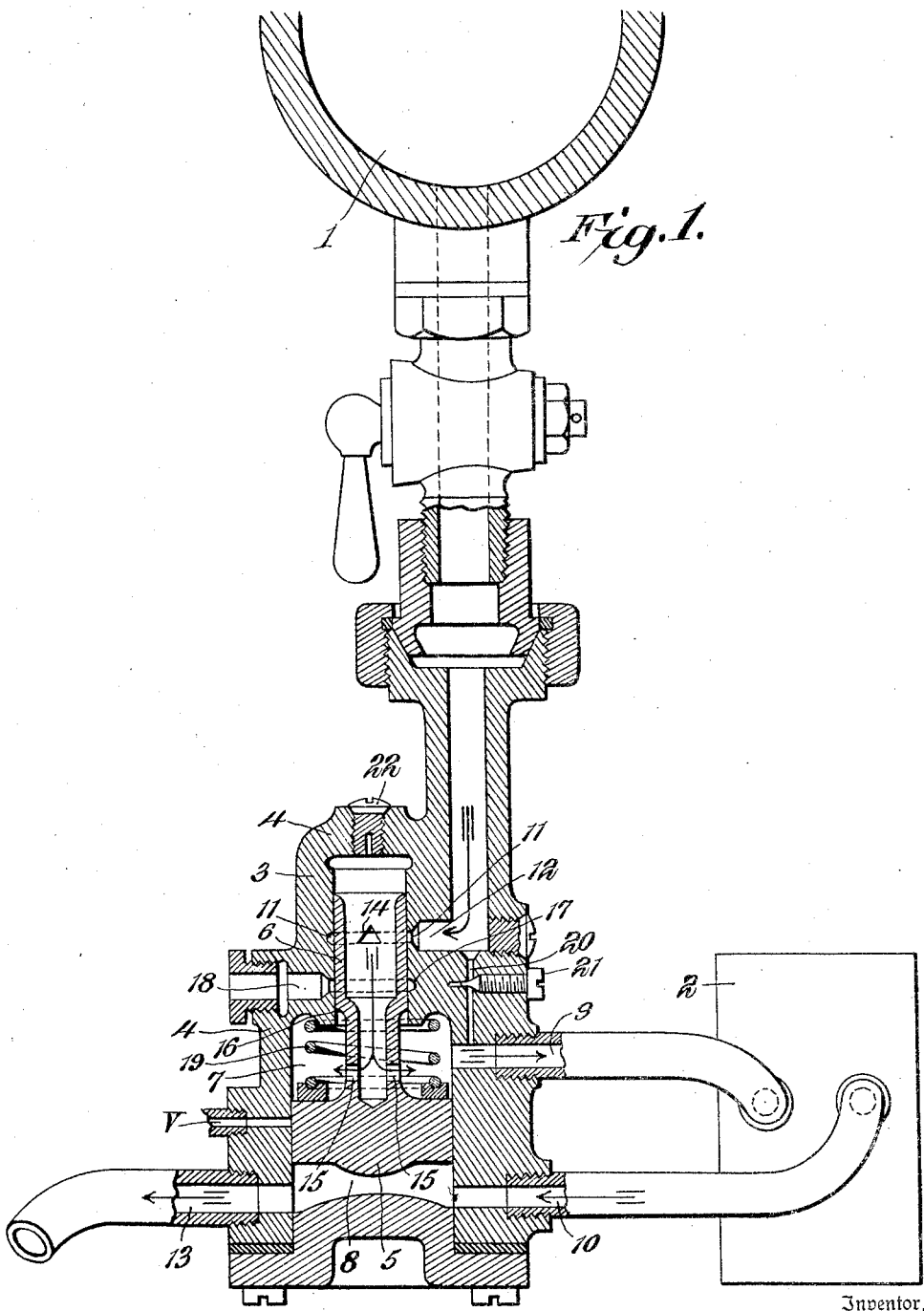

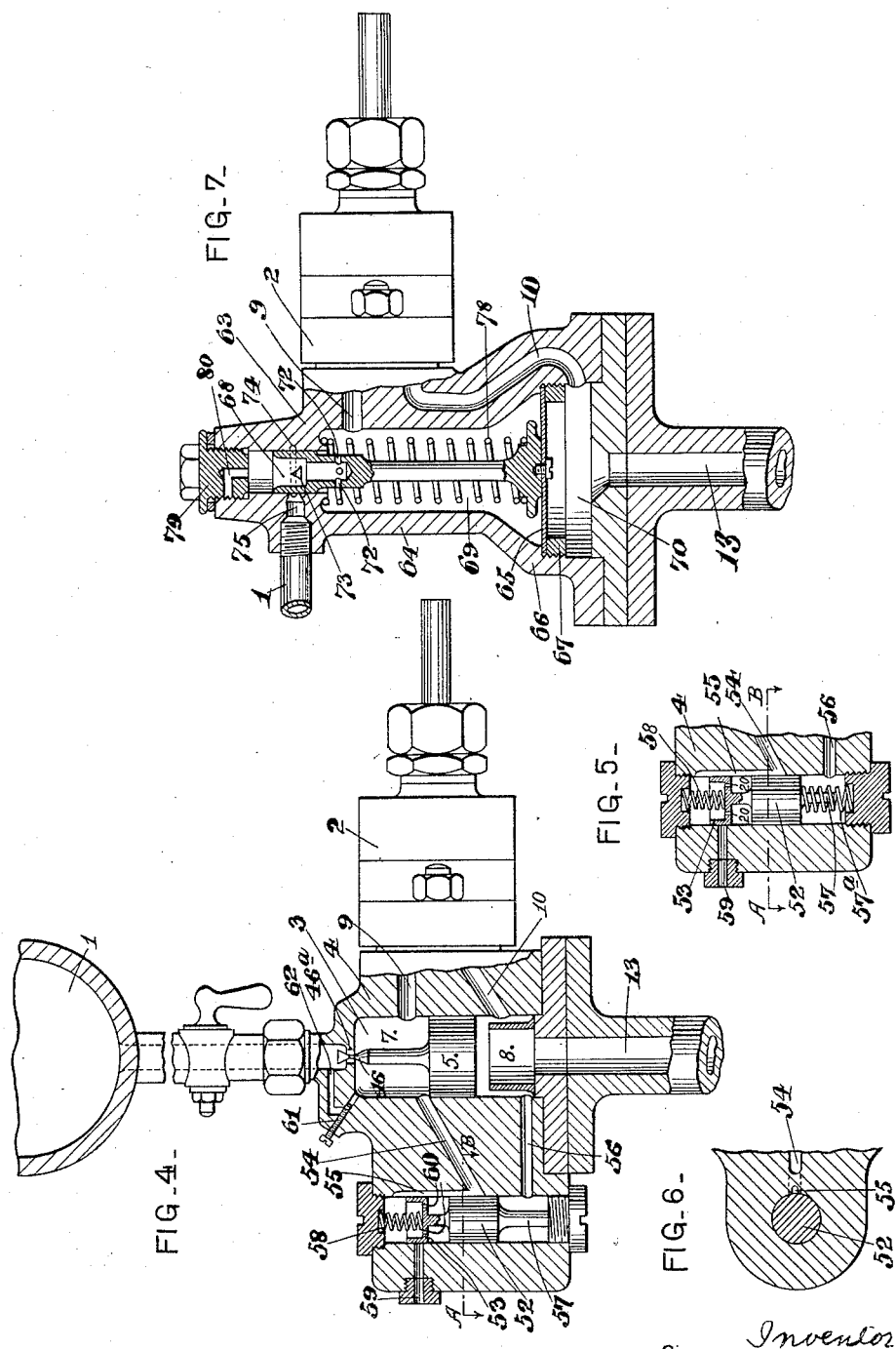

1,884,737

UNITED STATES PATENT OFFICE

EDWARD KINSELLA, OF SPONDON, NEAR DERBY, ENGLAND, ASSIGNOR TO CELANESE CORPORATION OF AMERICA, A CORPORATION OF DELAWARE

PUMPING APPARATUS

Application filed December 12, 1927, Serial No. 239,524, and in Great Britain December 23, 1926.

This invention relates to pumping apparatus, for delivering artificial silk spinning solutions or other applications, especially such applications as require liquids or solutions to be delivered under pressure with a high degree of regularity.

According to the present invention we employ apparatus comprising a source of pressure communicating with one or more measuring pumps of the gear wheel, piston or other type, the communication from the source of pressure to each measuring pump being made through one side of a pressure balance valve, the motor member of which is subjected on this side to the pressure of the inlet side of the measuring pump and is subjected on the other side to the pressure of the delivery side of the measuring pump and of the spinning jet or jets or other points of use, which motor member carries or is arranged to operate a valve member of the pressure balance valve to control the amount of spinning solution or other liquid fed to the measuring pump from the source of pressure.

We may for example employ, as the pressure balance valve in the said apparatus, a pressure balance valve of the piston type the motor member (i. e. the piston) of which is subjected to the before mentioned pressures on its respective opposite sides and which carries or is adapted to operate a valve member of the pressure balance valve—such for example as a slide valve member of the piston or other type or a double conical valve member—to control the amount of spinning solution or other fluid fed to the measuring pump from the source of pressure.

Or we may for example employ, as the pressure balance valve in said apparatus, a pressure balance valve of the diaphragm type, the motor member (i. e. the diaphragm) of which is subjected to the before mentioned pressures on its respective opposite sides and which carries or is adapted to operate a valve member of the pressure balance valve—such for example as a slide valve member of the piston or other type or a double conical valve member—to control the amount of spinning solution or other fluid fed to the measuring pump from the source of pressure.

Apparatus according to the invention may comprise one or or any desired number of pumping units each comprising a measuring pump with its appurtenant pressure balance valve arranged in combination as referred to, the communication from the measuring pump of the unit, or from the measuring pump of each unit, with the source of pressure being made through one side of the pressure balance valve of the unit, the motor member whereof as stated is subjected on this side to the pressure of the inlet side of the measuring pump and on the other side to the pressure of the delivery side of the measuring pump, and carries or is arranged to operate the valve member of the pressure balance valve to control the amount of liquid fed to the measuring pump of the unit.

The apparatus according to the present invention may also, if desired, comprise means for releasing abnormal or excess out-of-balance pressure which may develop on the delivery side of the measuring pump (or of one or more of the measuring pumps when a plurality of the pumping units are employed), due for example to the spinning jet or jets or other points of use becoming badly choked, as for instance by providing means adapted to operate under the excess out-of-balance pressure and place the feed side of the measuring pump or pumps subjected to the out-of-balance pressure in communication with the atmosphere or other point or points of lower pressure, thus releasing the pressure from the feed side of said measuring pump or pumps and as a result releasing the pressure at the delivery side thereof and thus causing cessation of the delivery to the affected jet or jets or other points of use of the spinning solution or other fluid from the apparatus or section of apparatus exhibiting the excess out-of-balance condition until the cause of the out-of-balance condition is removed. Or, for instance, we may provide means adapted to operate under the excess out-of-balance pressure and place both the feed side and the delivery side of the measuring pump or pumps subjected to the out-of-balance pressure in communication with the atmosphere or other point or points of lower pressure, thus releasing the pressure from both the feed side and the delivery side of said measuring pump or pumps and as a result causing cessation of the delivery to the affected jet or jets or other points of use of the spinning solution or other fluid from the apparatus or section of the apparatus exhibiting the excess out-of-balance condition until the cause of the out-of-balance condition is removed. It is of course understood that where a plurality of pumping units are employed with their respective measuring pumps each communicating with the single source of pressure that any number of them may each be provided with the means for releasing the abnormal or excess out-of-balance pressures which may develop on the delivery side of the measuring pumps.

Also if desired, means may be provided for releasing abnormal or excess out-of-balance pressure which may develop on the feed side of the measuring pump, or of one or more of the measuring pumps when a plurality of the pumping units is employed, or for preventing such excess out-of-balance pressures from developing on the feed side of the measuring pump or pumps. For instance means may be provided adapted to operate under any abnormal or excess out-of-balance pressure developing on the feed side of the measuring pump or pumps and place the feed side of th measuring pump or pumps subjected to the out-of-balance pressure in communication with the atmosphere or other point or points of lower pressure, thus releasing the pressure from the feed side of the measuring pump or pumps subjected to the out-of-balance pressure. Or for instance means may be provided adapted to operate under any abnormal or excess out-of-balance pressure developing on the feed side of the measuring pump or pumps and thereby to cut off communication between the given measuring pump or pumps and the source of pressure, thereby stopping delivery of the spinning solution or other fluid to the jets or other points of use from the apparatus or section of the apparatus exhibiting the excess out-of-balance condition until the cause of this condition is removed. It is of course understood that where a plurality of the pumping units are employed with their respective measuring pumps each in communication with the single source of pressure, that any number of them may each be provided with the means for releasing or preventing the development of abnormal or excess out-of-balance pressure on the feed side of the measuring pump or pumps.

The pressure balance valve of the pumping unit, or of each pumping unit, may, if desired, be so constructed and adapted to operate that its valve member cuts off entirely the communication between the measuring pump and the source of pressure when an abnormal or excess out-of-balance pressure develops on the delivery side of the measuring pump, whether or not means are provided for releasing such out-of-balance pressure.

Further, if desired, the pressure balance valve of the pumping unit or of each pumping unit may be so constructed and adapted to operate that its valve member cuts off entirely the communication between the measuring pump and the source of pressure when any abnormal or excess out-of-balance pressure develops either on the delivery side of the measuring pump or on the feed side thereof, whether or not means are provided for releasing such out-of-balance pressures.

In performing the invention, we may employ any suitable means as the source of pressure, as for instance one or more pumps of the gear wheel, piston, ram, or other type, one or more pressure vessels or one or more rams, or any other known means for supplying liquids under pressure, and in the case of spinning artificial silk or other operations requiring a high degree of regularity of delivery, we preferably employ one or more pumps of the gear wheel type as the source of pressure.

Preferably, especially in the spinning of artificial silk or other operations requiring delivery of the spinning solution or other fluid to a large number of jets or other points of use, we employ a number of the pumping units with their measuring pumps each communicating as referred to with a single or common source of pressure and preferably we employ one pumping unit for each artificial silk spinning nozzle or other point of use.

If desired, any suitable means may be provided for ensuring uniformity of pressure in the delivery from the source of pressure; thus, for example, one or more release valves may be provided in the line or lines leading from the source of pressure. Or there may be provided one or more piston, diaphragm or other control valves adapted to operate under the pressure of the delivery from the source of pressure and control the supply of spinning solution or other fluid to the pump or other source of pressure; or there may be provided instead of, or in conjunction with, such control valve or valves one or more valves adapted to operate under an excess of pressure in the delivery from the source of pressure to by-pass the excess from the line or lines leading from the source of pressure back to the inlet of the source of pressure. Further, if desired, in addition to any of such means, one or more air vessels may be provided in the line or lines leading from the source of pressure.

The accompanying drawings serve to illustrate some forms of execution of the present invention, it being understood that they are given only by way of illustration and are in no way limitative.

In these drawings Figure 1 shows in sectional elevation one form of pumping unit constructed in accordance with the invention, the form shown comprising a pressure balance valve of the piston type, the piston of which is subjected on its respective opposite sides to the pressure of the inlet side of the measuring pump and to the pressure of the delivery side of the measuring pump, and which piston is adapted to operate a slide valve member of the piston type to control the communication between the source of pressure and the measuring pump. The form shown also comprises means for releasing any abnormal or excess out-of-balance pressure which may develop on the delivery side of the measuring pump and for preventing abnormal or excess out-of-balance pressure from developing on the feed side of the measuring pump.

Figure 2 in these drawings is a diagrammatic elevation illustrating apparatus according to the invention applied to a metier or cabinet for the spinning of artificial silk by the dry or evaporative method of formation, the figure showing diagrammatically a number of pumping units, similar to that in Figure 1, fed with spinning solution from a source of pressure; three pumping units are seen in the section or portion of spinning apparatus shown in the figure, it being understood that the apparatus may comprise any desired number of them similarly connected to and fed by the source of pressure. The figure also illustrates diagrammatically the employment of a controlling valve for ensuring uniformity of pressure in the delivery from the source of pressure, this valve being adapted to operate under the pressure of the delivery from the source of pressure to control the supply of spinning solution to the source of pressure. Figure 3 shows this valve in section.

Figure 4 shows in sectional elevation one form of pumping unit constructed in accordance with the invention, the form shown comprising a pressure balance valve of the piston type, the piston of which operates a double conical valve member of the pressure balance valve; the form shown also comprises means for releasing any abnormal or excess out-of-balance pressure which may develop on the delivery side of the measuring pump. Means are also provided in this form for preventing abnormal or excess out-of-balance pressure from developing on the feed side of the measuring pump, the pressure balance valve of the unit being adapted to operate under any such abnormal or excess out-of-balance pressure to cut off entirely the communication between the source of pressure and the measuring pump.

Figure 5 shows in sectional view a modified form of part of the apparatus shown in Figure 4, this modified form being adapted to release any abnormal or excess out-of-balance pressure which may develop on either the feed side or the delivery side of the measuring pump.

Figure 6 is a fragmentary section on line A—B Figure 4 or on line A—B Figure 5.

Figure 7 shows in sectional elevation one form of pumping unit constructed in accordance with the invention, the form shown comprising a pressure balance valve of the diaphragm type, the diaphragm of which operates a slide valve member of the pressure balance valve, this member being, in the form illustrated, a slide-valve member of the piston type.

Figure 8 shows in sectional elevation one form of pumping unit constructed in accordance with the invention, the form shown comprising a pressure balance valve of the diaphragm type, the diaphragm of which operates a double conical valve member.

Figure 9 shows in vertical section a form of source of pressure provided with a by-passing valve for the purpose of releasing any excess pressure developing in the source of pressure.

Referring to Figure 1, 1 is the supply pipe or header leading from the source of pressure (not shown in the figure) which may for instance be a pump of the gear wheel type and which may feed any desired number of pumping units constructed in accordance with Figure 1. 2 indicates the measuring pump, this in the case illustrated being of the gear wheel type. 3 is the piston pressure balance valve, this valve being shown in vertical mid-section. The casing 4 of the piston pressure balance valve 3 is formed with two bores of different diameters, and has a piston 5 working in the lower and larger bore, which piston carries a hollow slide valve member 6 working in the upper and smaller bore. The casing may, if desired, be bored to a uniform diameter instead of to two different diameters, but we have found the form shown to be advantageous when dealing with artificial silk spinning solutions or other fluids requiring great sensitivity of control. The piston 5 divides the interior of the valve casing 4 into an upper chamber 7 and a lower chamber 8, these chambers communicating respectively by the ports 9 and 10 with the inlet and the delivery of the measuring pump 2. The upper chamber 7 also communicates with the header or supply pipe 1 (and hence with the source of pressure) via the holes 15 in the hollow slide valve member 6, the interior of this member, a hole or holes such as 14 in the slide valve member 6, an annular groove 11 in the casing 4, and the port 12 opening from the pipe connected to the header 1. The lower chamber 8 communicates via the port 13 with the spinning jet or jets served by the unit, or other point of use. The slide valve member 6 may be provided with any desired number of holes 14 (one or more) which may be of any suitable shape or form, for instance triangular or rectangular, and by the positioning of this hole or holes relatively to the annular groove 11 the slide valve member controls the amount of spinning solution or other fluid fed from the source of pressure to the measuring pump.

It will be seen that the source of pressure communicates with the measuring pump 2, the communication to the measuring pump being made through one side of the piston pressure balance valve 3, the piston 5 of which is subjected on this side to the pressure of the inlet side of the measuring pump 2 and on the other side to the pressure of the delivery side of the measuring pump 2 and of the spinning jet or jets or other point of use, the piston 5 operating the slide valve member 6 to control the amount of fluid fed to the measuring pump from the source of pressure.

In normal operation, the spinning solution or other fluid passes from the source of pressure through the header or supply pipe 1, through the port 12, the annular groove 11 and the hole or holes 14 into the hollow slide valve member 6, thence out through the holes 15 into the upper chamber 7 of the piston balance valve and through the port 9 to the measuring pump 2, passing from the measuring pump through the port 10, the lower chamber 8 of the piston pressure balance valve and the port 13 to the spinning jet or jets or other point of use.

With the arrangement shown, substantially only the correct amount of spinning solution or other fluid required is permitted to be fed to the measuring pump, as any pressure in the upper chamber 7 in excess of the pressure in the lower chamber 8 causes the piston 5 to move downwards and reduce the amount of fluid admitted, by restricting the aperture between the hole or holes 14 and the annular groove 11, the piston 5 moving downwards until a balance is created between the pressures of the upper and lower chambers; conversely, if the resistance in the spinning jet or other point of use rises (due for instance to partial choking) it means that the pressure in the lower chamber 8 must also rise to overcome this resistance; this causes the piston 5 to move upwards and increase the aperture between the hole or holes 14 and the annular groove 11 sufficiently to restore the balance of pressures, the pressure in each of the chambers 7 and 8 being then higher than before. So long as the pressure in the upper chamber 7 is equal to the pressure in the lower chamber 8 the pressure of the delivery from the measuring pump is always that required to feed the measured quantity of fluid to the spinning jet or jets or other point of use, because, so long as the pressure on the delivery side of the measuring pump is equal to that on its feed side, the measuring pump will continue to deliver the required measured quantity of liquid per unit of time, provided, of course, the pump speed be constant.

If an abnormal or excess out-of-balance pressure develops on the delivery side of the measuring pump (due for instance to a spinning jet or other point of use becoming badly choked) such that the resistance in the delivery rises above the pressure capacity of the header, the piston 5 and slide valve 6 will move upwards. The first effect of this movement is to close the aperture between the hole or holes 14 in the slide valve member and the annular groove 11, thereby entirely preventing communication between the source of pressure and the upper chamber 7. The piston 5 continues to rise (by reason of the fact that the measuring pump continues to take in fluid from the upper chamber 7 and pass it into the lower chamber 8) until the shoulder 16 of the slide valve member 6 uncovers an annular groove 17 in the valve casing 4, which groove 17 communicates via a port 18 with the atmosphere, and when the shoulder 16 of the slide valve member uncovers the annular groove 17 the fluid is released from the upper chamber 7, and as a result pressure is reduced on the delivery side of the measuring pump, and delivery of the spinning solution or other fluid from the unit ceases until the cause of the out-of-balance condition is removed. To prevent losses by slight leakage of volatile liquids or solvents (when spinning solutions or other fluids comprising such solvents or liquids are employed), the port 18 is preferably sealed by any convenient material of low strength, such as paper, parchment or fabric, rendered impervious by varnish or similar substance.

After removal of the cause of the out-of-balance condition, the piston is returned to its normal operative position by the helical spring 19, this spring in the present example being provided for this purpose only.

If any abnormal or excess out-of-balance pressure develops in the supply from the source of pressure (due for example to the inlet of the measuring pump becoming badly choked), the piston 5 will descend to an extent such that the aperture between the hole or holes 14 in the slide valve member and the annular groove 11 is closed, thereby cutting off the communication between the measuring pump and the source of pressure, the unit ceasing to deliver until the cause of the out-of-balance condition is removed.

A bypass connection 20 controlled by the screw valve 21 is provided between the upper chamber 7 and the pipe leading to the header or supply pipe 1 so that air can be displaced and sufficient fluid admitted to allow the measuring pump to raise the piston 5 to its normal working position when first starting the unit or in starting up after the pressure balance valve has been emptied. A screw plug 22 is also provided in the top of the valve casing 4 to permit air to be displaced from the pressure balance valve when starting up the unit, the screw plug being provided with a vertical slot or saw cut as shown, which enables the air to be expelled from the pressure balance valve without fully unscrewing the screw plug.

Means are shown in this figure for releasing any abnormal or excess out-of-balance pressure which may develop in the upper chamber 7 (i. e. the feed side of the measuring pump), these means comprising a port V communicating with the atmosphere provided in the casing 4, the piston 5 being adapted to uncover this port only when said piston moves down under the effect of such abnormal or excess out-of-balance pressure.

Referring to Figures 2 and 3, these illustrate one form of apparatus according to the invention applied to a metier or cabinet for dry-spinning artificial silk, this form of apparatus comprising a number of pumping units precisely similar to the unit described with reference to Fig. 1; the apparatus is further shown as comprising a controlling valve adapted to operate under the pressure of the delivery from the source of pressure to control the supply of spinning solution to the source of pressure, with a view to keeping the pressure of the delivery from the source of pressure uniform; it is understood that this controlling valve may be omitted or that other means may be employed for keeping the pressure of the delivery from the source pressure uniform.

In Figure 2, 30 is a pump of the gear wheel type and constitutes the source of pressure. 3, 3a, and 3b are the pressure balance valves and 2, 2a, 2b the measuring pumps of the respective pumping units, these pumping units being constructed and adapted to operate precisely as described with reference to Figure 1.

The spinning solution passes from the source of pressure 30, via the header or supply pipe 34 to the bench pipes 35, 35a and 35b, and from thence respectively through the pressure balance valves 3, 3a, 3b, and their respective measuring pumps 2, 2a, 2b, to the spinning jets 36, 36a, 36b, supplied by the respective pumping units, these jet extruding the solution into the spinning metier or cabinet 37 where the artificial silk filaments are formed by the evaporation of the volatile solvent in the known manner. Should an abnormal or excess out-of-balance pressure develop on the delivery side of one or more of the measuring pumps, due for instance to the spinning jet or jets becoming badly choked, the pressure is released in the manner described in reference to Figure 1, and delivery from the unit or units concerned will cease until the cause of the out-of-balance condition is removed; similarly, should an abnormal or excess out-of-balance pressure develop in the supply from the source of pressure to one or more of the measuring pumps, the communication between the measuring pump or pumps concerned and the source of pressure will be cut off and the pump or pumps concerned will cease to deliver to the corresponding spinning jet or jets precisely in the manner described with reference to Figure 1.

For ensuring uniformity of pressure in the delivery from the source of pressure, a controlling valve 39 (of which Figure 3 is a vertical section on a larger scale) is shown as arranged in connection with the header 34 and with the inlet 38 to the source of pressure, this valve being adapted to operate under the pressure of the delivery of the source of pressure to control the supply of the spinning solution to the source of pressure. Referring to Figures 2 and 3, the valve 39 has three ports, 40, 41 and 42 of which ports 40 is connected to the supply of spinning solution, 41 to the inlet to the pump 30 forming the source of pressure, and 42 to the header 34. The controlling valve 39 comprises a piston 43 and a slide valve member 44 carried thereby, see Figure 3; the spinning solution from the source of supply (not shown) passes through the port 40 and thence through the port 41 to the inlet 38 of the pump 30 forming the source of pressure. Should the pressure in the delivery from the source of pressure rise (due for instance to the functioning of the means hereinbefore referred to for releasing abnormal or excess out-of-balance pressure or to otherwise stopping of the delivery of one or more of the jets), the pressure of the delivery from the source of pressure, acting through the port 42 causes the piston 43 and the slide valve member 44, carried thereby to rise, thus restricting the supply of spinning solution to the pump 30 forming the source of pressure. Similarly any decrease in the pressure in the delivery from the source of pressure causes the piston 43 and the slide valve member 44 to descend, thus increasing the supply of spinning solution to the source of pressure.

In order to release any sudden increase of pressure in the delivery from the source of pressure or for otherwise compensating any sluggish action of the controlling valve 39, a by-passing valve may be employed. Such a by-passing valve is shown together with a source of pressure on a larger scale in vertical section in Figure 9.

Referring to Figure 9, the gear wheel pump 30 constituting the source of pressure is provided with the by-passing valve 95, having a valve member 95A working in a bore in the casing 96 of the pump 30 and controlling the entrance to the return by-pass port or channel 97 between the outlet port 98 and the inlet port 38 of the pump 30. The valve member 95A is guided by its stem 99 working in the guide 100 and by its cruciform lower extension 101 working in the bore of casing 96, and is pressed onto its seat 102 by spring 103. Should the controlling valve 39 be sluggish in action or fail to prevent an excess pressure from developing in the delivery from the source of pressure, the excess pressure acting through the outlet port 98 raises the valve member 95A off its seat 102 against the pressure of spring 103 and releases the excess pressure through the return by-pass channel or port 97 back to the port 38 forming the inlet to the source of pressure.

Referring to Figures 4 and 6, 1 is the supply pipe or header leading from the source of pressure (not shown in the figure) which may for instance be a pump of the gear wheel type and which may feed any desired number of pumping units constructed in accordance with Figures 4 and 6. 2 indicates the measuring pump, this in the case illustrated being of the gear wheel type. 3 is the piston pressure balance valve, this valve being shown in vertical mid section. The casing 4 of the piston pressure balance valve is formed with a bore in which the piston 5 works, which piston carries a double conical valve member 46 controlling the throat 46a. The piston 5 divides the interior of the valve casing 4 into an upper chamber 7 and a lower chamber 8, these chambers communicating respectively by ports 9 and 10 with the inlet and delivery side of the measuring pump 2. The upper chamber 7 also communicates with the header or supply pipe 1 (and hence with the source of pressure) via the throat 46a controlled by the double conical valve member 46. By the positioning of the double conical valve member 46 relatively to the throat 46a, the valve member 46 controls the amount of spinning solution or other fluid fed from the source of pressure to the measuring pump. The lower chamber 8 communicates via the port 13 with the spinning jet or jets served by the unit, or other point of use.

It will be seen that the source of pressure communicates with the measuring pump 2, the communication to the measuring pump being made through one side of the piston pressure balance valve 3, the piston 5 of which is subjected on this side to the pressure of the inlet side of the measuring pump 2 and on the other side to the pressure of the delivery side of the measuring pump 2 and of the spinning jet or jets or other point of use, the piston 5 operating the double conical valve member 46 of the pressure balance valve to control the amount of fluid fed to the measuring pump from the source of pressure.

The casing 4 of the pressure balance valve is also provided with a second bore in which an auxiliary piston 52 works, which piston is adapted to operate a slide valve member of the piston type 53 to release abnormal or excessive out-of-balance pressure developing in the chamber 8. The piston 52 is subjected on its respective opposite faces to the pressure of the upper chamber 7 acting through the port 54 and vertical groove 55 and to the pressure of the lower chamber 8 acting through the port 56. The piston 52 is supported by a leg or support 57 formed with or fixed to said piston, and works against the pressure of the spring 58 to operate the valve 53 to release the abnormal or excess out-of-balance pressure through the port 59. The valve member 53 is provided with a number of holes 60 to allow movement of said valve through the spinning solution or other fluid in the bore. In normal operation of the unit the valve member 53 keeps the port 59 closed, the spring 58 being of such strength as to allow the piston 52 to rise only when a given excess of pressure develops in the chamber 8 and port 56.

It will of course be understood that we may employ any equivalent motor member, for instance, a diaphragm, instead of the auxiliary piston 52; and that instead of the slide valve member 53 controlling the port 59 we may employ any other suitable valve, as for instance a needle valve member controlling an orifice.

In normal operation the spinning solution or other fluid passes from the source of pressure through the header or supply pipe 1, through the throat 46a into the upper chamber 7 of the piston pressure balance valve and through the port 9 to the measuring pump 2, passing from the measuring pump through the port 10, the lower chamber 8 of the piston pressure balance valve, and the port 13 to the spinning jet or jets or other point of use.

With the arrangement shown, substantially only the correct amount of spinning solution or other fluid required is permitted to be fed to the measuring pump, as any pressure in the upper chamber 7 in excess of the pressure in the lower chamber 8 causes the piston 5 to move downwards and reduce the amount of fluid admitted, by restricting the aperture between the upper cone of the double conical valve member 46 and throat 46a the piston 5 moving downwards until a balance is created between the pressures of the upper and lower chambers; conversely, if the resistance of the spinning jet or other point of use rises (due for instance to partial chocking), it means that the pressure in the lower chamber 8 must also rise to overcome this resistance; this causes the piston 5 to move upwards to increase the aperture between the upper cone of the double conical valve member 46 and throat 46a sufficiently to restore the balance of pressures, the pressure in each of the chambers 7 and 8 being then higher than before. In passing, it should be noted that the lower cone of the double conical valve member 46 is situated at a relatively large distance from the throat 46a and this lower cone only functions to restrict the throat 46a when an abnormal or excess out-of-balance pressure occurs in the lower chamber 8. So long as the pressure in the upper chamber 7 is equal to the pressure in the lower chamber 8 the pressure is always that required to feed the measured quantity of fluid to the spinning jet or jets or other point of use, because, so long as the pressure on the delivery side of the measuring pump is equal to that on its feed side, the measuring pump will continue to deliver the required measured quantity of liquid per unit of time, assuming of course the pump speed be constant.

If an abnormal or excess out-of-balance pressure develops on the delivery side of the measuring pump (due for instance to a spinning jet or other point of use becoming badly choked) such that the resistance in the delivery rises above the pressure capacity of the header, the piston 5 and the double conical valve member 46 will move upwards. The first effect of this is to close the throat 46a by the lower cone of the double conical valve member 46, thereby entirely preventing communication between the source of pressure and the upper chamber 7. At the same time, the auxiliary piston 52 moves up and causes the lower edge of its piston valve member 53 to uncover the port 59, and by these means the pressure is released from the upper chamber 7 of the pressure balance valve, via the port 54, groove or channel 55 and port 59 to the atmosphere or other point of low pressure. This release of pressure causes the piston 52 to rise further until its lower end uncovers the port 54, thereby releasing the pressure from the lower chamber 8 and allowing the fluid to pass from the lower chamber 8 via the port 56, mouth of the port 54, groove or channel 55 and the port 59 to the atmosphere or other point of low pressure; and at the same time the piston 5 descends and closes the throat 46a by means of the upper cone of the double conical value member 46; the delivery from the unit to the spinning jet or jets or other points of use ceasing until the cause of the out-of-balance condition is removed. On removal of the cause of the out-of-balance condition the piston 52 and the slide valve member 53 are returned to their normal position by the spring 18.

Should an abnormal or excess out-of-balance pressure develop in the supply from the source of pressure (due for example to the inlet of the measuring pump becoming badly choked) the piston 5 will descend to such an extent that the throat 46a is closed by the upper cone of the double conical valve member 46, thereby cutting off communication between the measuring pump and the source of pressure, the unit ceasing to deliver until the cause of the out-of-balance condition is removed.

For starting up the unit when the valve member 46 is in the closed position (i. e. when the throat 46a is closed by the upper cone of the valve member 46), for instance for starting up the unit initially or after removal of the cause of either of the before mentioned out-of-balance conditions, the screw valve 61 is temporarily opened to allow fluid to pass from the header 1 via the passage 62 into the upper chamber 7. Fluid so passing into the chamber 7 passes via the measuring pump 2 to the lower chamber 8 to raise the piston 5 and thus open the throat 46a and put the unit in operation.

Figure 5 shows in sectional view a modified form of the means employed in Figure 4 for releasing abnormal or excess out-of-balance pressure from the delivery side of the measuring pump, the form shown in Figure 5 being adapted to release an excess out-of-balance pressure from either the feed side or the delivery side of the measuring pump. Figure 5 shows only such modified means, the remainder of the pumping unit being supposed as constructed precisely as described in reference to Figures 4 and 6. Similar numerals in Figures 4 and 6 indicate corresponding parts in Figure 5.

Referring to Figures 5 and 6, it will be seen that whereas the parts of said means are otherwise similar to those shown in Figures 4 and 6, the auxiliary piston 52 in Figure 5 works against the pressure of a lower spring 57a as well as against the pressure of the upper spring 58, and that the leg 57 is of such length as to enable the auxiliary piston 52 to move down sufficiently for the valve member 53 to uncover the port 59. Under normal conditions the pressures of the springs 57a and 58 keep the valve member 53 in such position that it keeps the port 59 closed. If an abnormal or excess out-of-balance pressure develops in the delivery side of the measuring pump, the piston 52 and its slide valve member 53 and the valve member of the pressure balance valve function as described with reference to Figures 4 and 6, and the pumping unit ceases to deliver until the cause of the out-of-balance condition is removed. In the converse case, where any abnormal or excess out-of-balance pressure develops on the feed side of the measuring pump, the excess out-of-balance pressure, acting through the port 54 and vertical groove 55, causes the piston 52 and its slide valve member 53 to move down sufficiently for the upper edge of said valve member to uncover the port 59, thereby releasing the pressure from the feed side of the measuring pump via the port 54, vertical groove 55, the holes 60 in the valve member 53, and the port 59 to the atmosphere or other point of low pressure. At the same time the throat 46a (Figure 4) becomes closed by the upper cone of the double conical valve member 46 of the pressure balance valve and the pumping unit ceases to deliver until the cause of the out-of-balance condition is removed. On removal of the cause of either of the out-of-balance pressures the auxiliary piston 52 and its slide valve member 53 are restored to their normal position by the springs 57a and 58.

Referring to Figure 7, the pumping unit shown in this figure comprises a pressure balance valve of the diaphragm type, the diaphragm of which operates a slide valve member of the piston type. In this figure, 1 is the inlet pipe leading from the source of pressure (not shown in the figure) which may for instance be a pump of the gear wheel type and which may feed any desired number of pumping units constructed in accordance with Figure 7. 2 indicates the measuring pump, this in the case illustrated being of the gear wheel type. 63 is the diaphragm pressure balance valve, this valve being shown in vertical mid section. A diaphragm 65 is held between a shoulder 66 in the casing 64 and the threaded ring 67; the diaphragm 65 carries a hollow slide valve member 68 working in an upper bore in the casing 64, and divides the casing 64 into an upper chamber 69 and a lower chamber 70. The upper chamber 69 communicates via the port 9 with the inlet of the measuring pump 2 and with the inlet pipe 1 (and thence with the source of pressure) via the holes 72 in the hollow slide valve member 68, the interior of this member, a hole or holes such as 73 in the slide valve member, the annular groove 74 in the casing 64, and the port 75 opening from the inlet pipe 1. The lower chamber 70 communicates via the port 10 with the delivery of the measuring pump 2, and via the port 13 with the spinning jet or jets or other points of use. The slide valve member 68 may be provided with any desired number of holes 73 (one or more) which may be of any desired shape or form, for instance triangular or rectangular, and by the positioning of this hole or holes relatively to the annular groove 74 the slide valve member controls the amount of spinning solution or other fluid fed from the source of pressure to the measuring pump.

In normal operation the spinning solution or other fluid passes from the source of pressure (it may be via a header feeding one or more of the pumping units shown in this figure) through the inlet pipe 1, through port 75, the annular groove 74, and the hole or holes 73 into the slide valve member 68, thence out through the holes 72 into the upper chamber 69 of the pressure balance valve and through the port 9 to the measuring pump 2, passing from the measuring pump through the port 10, the lower chamber 70 of the pressure balance valve and the port 13 to the spinning jet or jets or other point of use.

Should the pressure in the upper chamber 69 rise in excess of that in the lower chamber 70, the diaphragm 65 causes the valve member 68 to move down and reduce the amount of fluid admitted, by restricting the aperture between the hole or holes 73 and the annular groove 74 the diaphragm 65 moving the valve member 68 downwards until a balance is created between the pressures in the upper and lower chambers; conversely, if the resistance in the spinning jet or other point of use rises (due for instance to partial choking), the pressure in the lower chamber 70 also rises and causes the diaphragm 65 to raise the valve member 68 and increase the aperture between the hole or holes 73 and the annular groove 74 sufficiently to restore the balance of pressures. By these means the delivery from the pumping unit is kept substantially uniform.

Should an abnormal or excess out-of-balance pressure develop in the lower chamber 70 (due for instance to the spinning jet or jets or other point of use becoming badly choked), the diaphragm 65 raises the slide valve member 68 to such a position that the aperture between the hole or holes 73 and the annular groove 74 is closed, thereby entirely preventing communication between the source of pressure and the upper chamber 69. The slide valve member 68 remains in this position and the unit ceases to deliver until the cause of the excess out-of-balance pressure is removed. On removal of this cause the diaphragm 65 and the slide valve member 68 are returned to their normal position by the spring 78.

Should any abnormal or excess out-of-balance pressure develop in the upper chamber 69, the diaphragm 65 lowers the slide valve member 68 to such a position that the aperture between the hole or holes 73 and the annular groove 74 is closed, thereby entirely preventing communication between the source of pressure and the upper chamber 69, the unit ceasing to deliver until the cause of the out of balance pressure is removed.

No means are shown in Figure 7 for releasing an abnormal or excess out-of-balance pressure developing in the lower chamber 70 (i. e., the delivery side of the measuring pump), but it is of course understood that such means may be employed, for instance the means for releasing such excess out-of-balance pressure described with reference to Figures 4 and 6 or Figures 5 and 6 may be fitted to the apparatus shown in Figure 7.

Further, no means are shown in Figure 7 for releasing any abnormal or excess out-of-balance pressure developing in the upper chamber 69 (i. e., the feed side of the measuring pump), but it is of course understood that such means may be employed, for instance the means for releasing such excess out-of-balance pressure described with reference to Figure 5 may be fitted to the apparatus shown in Figure 7.

The apparatus shown in Figure 7 is provided with a screw plug 79 provided with a channel 80. On first starting the unit or on restarting a unit which has become emptied of fluid, the plug 79 may be unscrewed sufficiently for the channel 80 to communicate with the atmosphere, thus enabling air in the pumping unit to be displaced by the spinning solution or other fluid, and when the unit is full of fluid the plug 79 is screwed down to close the channel 80.

While the channelled plug 79 is only shown in Figure 7 it may of course be employed in the pumping units described with reference to Figures 4 and 6 or Figures 5 and 6 or Figure 8.

Figure 8 shows a pumping unit similar in construction and operation to that shown in Figure 7, similar numerals in Figure 8 indicating corresponding parts in Figure 7, but in Figure 8 the diaphragm 65 operates a double conical valve member 81 controlling a throat 82, instead of operating a hollow slide valve member.

In the apparatus shown in Figure 8 in the normal operation the control of the supply of the spinning solution from the source of pressure and hence the maintenance of equal pressures as between the two sides of the measuring pump is effected by the positioning of the upper cone of the valve member 81 relatively to the throat 82.

Should an abnormal or excess out-of-balance pressure develop in the lower chamber 70, the diaphragm raises the valve member 81 sufficiently for the lower cone of the valve member 81 to close the throat 82, thereby entirely preventing communication between the source of pressure and the upper chamber 69.

Conversely should any abnormal or excess out-of-balance pressure develop in the upper chamber 69, the diaphragm lowers the valve member 81 sufficiently for the upper cone of the valve member 81 to close the throat 82, thereby entirely preventing communication between the source of pressure and the upper chamber 69.

Should the throat 82 become closed by either the upper cone or lower cone of the valve member 81 (due for instance to the valve member sticking in the throat after development of an excess out-of-balance pressure), the screw 86 may be loosened to open the port 85 and allow the fluid to pass from the inlet pipe 1 to the upper chamber 69, measuring pump 2 and lower chamber 70, and thereby cause the diaphragm 65 to move the valve member 81 to open the throat 82, whereupon the port 85 is closed by the screw 86.

What I claim and desire to secure by Letters Patent is:—

1. Pumping apparatus for delivering artificial silk spinning solutions or other fluids, comprising a source of pressure, at least one pumping unit and a communication between the same and the source of pressure, the pumping unit itself comprising a pressure balance valve and a measuring pump, whereof the pressure balance valve comprises (a) a motor member subjected on the one side to the pressure of the inlet side of the measuring pump and on the other side to the pressure of the delivery side of the measuring pump and to the pressure of the delivery from said pumping unit, and (b) a valve member operatively connected to said motor member, said valve member being adapted to control the supply of fluid to the pumping unit.

2. Pumping apparatus for delivering artificial silk spinning solutions or other fluids, comprising a source of pressure, at least one pumping unit and a communication between the same and the source of pressure, the pumping unit itself comprising a pressure balance valve and a measuring pump, the inlet side of which measuring pump communicates with said source of pressure through one side of said pressure balance valve, the pressure balance valve comprising (a) a motor member subjected on the one side to the pressure of the inlet side of the measuring pump and on the other side to the pressure of the delivery side of the measuring pump and to the pressure of the delivery from said pumping unit, and (b) a valve member operatively connected to said motor member, said valve member being adapted to control the supply of fluid to the pumping unit.

3. Pumping apparatus according to claim 2 and wherein the valve member of the pressure balance valve is arranged to cut off entirely the supply of fluid to the pumping unit when an excess out of balance pressure develops on the delivery side of the measuring pump.

4. Pumping apparatus according to claim 2 and wherein the valve member of the pressure balance valve is arranged to cut off entirely the supply of fluid to the pumping unit when an excess out of balance pressure develops on either side of the measuring pump.

5. Pumping apparatus according to claim 2 and wherein the pumping unit further comprising means adapted to operate under any excess out of balance pressure developing on the delivery side of the measuring pump to place the feed side of the measuring pump in communication with a point of lower pressure, thus releasing the pressure from the feed side of the measuring pump and thereby causing cessation of delivery from the pumping unit until the cause of the out of balance condition is removed.

6. Pumping apparatus according to claim 2 and wherein the pumping unit further comprises means adapted to operate under any excess out of balance pressure developing on either side of the measuring pump to place the feed side of the measuring pump in communication with a point of lower pressure, thus releasing the pressure from the feed side of said measuring pump and thereby causing cessation of delivery from the pumping unit until the cause of the out of balance condition is removed.

7. Pumping apparatus according to claim 2 and comprising a plurality of pumping units fed with a common source of pressure and means for ensuring uniformity of pressure in the delivery from the source of pressure.

8. Pumping apparatus according to claim 2 and wherein the pumping unit further comprises a port communicating between the inlet side of the measuring pump and the atmosphere and normally closed by the valve member of the pressure balance valve, said valve member being adapted to open said port by movement of the motor member of the pressure balance valve under any excess out of balance pressure developing on the delivery side of the measuring pump, whereupon the pressure is released from the feed side of the measuring pump thereby causing cessation of delivery from the pumping unit until the cause of the out of balance condition is removed.

9. Pumping apparatus according to claim 2 and wherein the valve member of the pressure balance valve is arranged to control the supply of fluid to the pumping unit and to cut off entirely the supply of fluid to the pumping unit when an excess out of balance pressure develops on either side of the measuring pump, and wherein the pumping unit further comprises means adapted to operate under any excess out of balance pressure developing on either side of the measuring pump to place the feed side of the measuring pump in communication with a point of lower pressure, thus releasing the pressure from the feed side of said measuring pump and thereby causing cessation of delivery from the pumping unit until the cause of the out of balance condition is removed.

10. Pumping apparatus for delivering fluids under pressure, comprising a high pressure conduit, a pump, and a reducing valve interposed in series between said high pressure conduit and said pump, said reducing valve having an inlet port communicating with said high pressure conduit, a port communicating between the low pressure side of said reducing valve and the inlet side of said pump and a port communicating with the delivery side of the pump, a moving member subjected on its respective opposite sides to the pressure of the inlet side of the pump and to the pressure of the delivery side of the pump, and a valve member connected to said moving member and arranged to control the inlet port of said reducing valve; whereby the supply of fluid from the high pressure conduit to the pump is controlled and equal pressures are maintained as between the inlet and delivery sides of the pump as long as the pressure on the delivery side thereof does not exceed the pressure of the high pressure conduit.

In testimony whereof I have hereunto subscribed my name.

EDWARD KINSELLA.